United States Patent [19]

Steele

[11] Patent Number: 4,836,834
[45] Date of Patent: Jun. 6, 1989

[54] AIR FILTER WITH BACK FLOW CLEANING
[75] Inventor: Gregory J. Steele, Stillwater, Minn.
[73] Assignee: Dynamic Air Inc., St. Paul, Minn.
[21] Appl. No.: 188,433
[22] Filed: Apr. 29, 1988
[51] Int. Cl.⁴ .............................................. B01D 46/04
[52] U.S. Cl. ........................................... 55/96; 55/302
[58] Field of Search ............................ 55/96, 302, 521

[56] References Cited
U.S. PATENT DOCUMENTS

| | | | |
|---|---|---|---|
| 3,594,992 | 7/1971 | Carr | 55/302 |
| 3,816,978 | 6/1974 | O'Dell | 55/96 |
| 4,289,511 | 9/1981 | Johnson | 55/302 |
| 4,637,473 | 1/1987 | Gillis et al. | 55/302 X |
| 4,666,472 | 5/1987 | Klimczak et al. | 55/96 |

OTHER PUBLICATIONS

"Modu-Kleen Dust Collection Systems", Bulletin 732A-5M, Division of Dynamic Air.

Primary Examiner—Charles Hart
Attorney, Agent, or Firm—Jacobson and Johnson

[57] ABSTRACT

In a housing enclosing a collector chamber for filtering air laden with dust or other contaminants, a filter element is mounted in line with a clean air opening into the chamber through the housing and is attached so that contaminated air coming into another housing opening into the chamber must pass through the filter media for removing the contaminants from the air. From time to time a stream of pressurized cleaning air is applied in the reverse direction through the first opening to drive contaminants off the filter media. A deflector or diffuser is located in line with the clean air opening to diffuse the applied stream of cleaning air so that it does not directly impinge the filter element. The applied pressurized cleaning air stream completely closes off the clean air opening through which it is applied so that there can be no flow of the cleaning air back through the opening through which it enters so that the air pressure forces the cleaning air through the filter media to dislodge contaminants therefrom.

4 Claims, 1 Drawing Sheet

AIR FILTER WITH BACK FLOW CLEANING

FIELD OF THE INVENTION

This invention is utilized in industrial type dust collectors which are used to remove dust particles or other contaminants which are being carried by air in industrial plants. More particularly, the invention is directed toward a dust collector of this nature incorporating means for periodically using reverse air flow through the filter element in the dust collector to drive contaminants off the filter media.

DESCRIPTION OF THE PRIOR ART

U.S. Patents by Nemesi U.S. Pat. No. 4,278,454 dated 1981 and by Church U.S. Pat. No. Re. 24,954 dated March, 1961 are representative of dust collectors having filters which are periodically cleaned by back flow air. The dust collector of the instant invention operates normally in the same or very similar fashion as the normal operation of the devices described in the above-identified patents. In the normal course, air which may be carrying dust or other contaminants enters through an opening into a filter chamber in which is mounted a filter element containing a suitable filter media and the air is usually drawn or forced to pass through the filter media where the contaminants are removed and the clean air then passes out through another opening from the chamber. In order to maintain efficient filtering, from time to time a momentary pulse of clean pressurized air is applied in the reverse direction into the filter chamber through the opening from which the clean air normally emerges to force air back into the filter to drive contaminants off the filter media. Some filters are in the form of a loose hanging, flexible bag or sack made out of some suitable fabric. For cleaning, the reverse cleaning air is directed to strike the filter media directly so as to mechanically flex the bag or sack to vibrate it to shake the dust off. In other conventional filter devices, the filter element may be cylindrical having a central air passage core surrounded by filter media with the follow core closed off at one end with an end plate and an open end facing the clean air opening in the filter chamber. Typically the filter media may be in the form of a relatively stiff cardboard-like material, which may be pleated and which is not easily flexed to shake off the contaminants. For cleaning this type of filter element, the reverse air pulse should be applied with sufficient pressure so that the cleaning air will pass through the filter media in the reverse direction to dislodge and remove the bulk of the contaminants from the media. One problem that arise is that the stream of cleaning air is likely to impact the filter element end plated directly with too much force and thereby weaken the seal around the end plate. Also, if the air stream directly strikes the filter media, as in the bag-type filter, it may rupture or partially destroy the effectiveness of the filter media thereby making the filter element less efficient or useless. In the past, as shown in the Nemesi patent, a reinforcing rod was sometimes used to hold the end plate in place because of the impact of the pulse of cleaning air.

SUMMARY OF THE INVENTION

The instant invention utilizes a cylindrical cartridge-type filter element similar to that described previously and shown and described in the Nemesi patent. However, in lieu of the Nemesi blow shaped inlet as the clean air opening through which the cleaning pressurized air is applied, the instant invention utilizes a straight walled tubular throat member along with a deflector or diffuser member, preferably in the shape of a cone, located within the central air passageway or hollow core of the cylindrical filter element opposite the opening through which the cleaning air pulse is applied. The deflector is located with respect to the tubular throat member and the filter element such that it diffuses the injected stream of cleaning air so that it does not directly strike either the end plate of the filter element or the surrounding filter media and yet the pressure present when the cleaning air is applied is sufficient to drive the air in the reverse direction through the filter media to dislodge the contaminants from the filter media. As part of the invention, the dimension of the tubular throat member with respect to the size of the injected cleaning air pulse is such that the latter embraces or closes off the entire opening of the throat member to maintain sufficient pressure with the air passageway or core of the filter element to drive the air reversibly through the media to remove the contaminants from the filter media.

BRIEF DESCRIPTION OF THE DRAWING

The drawing is a vertical section view of a preferred embodiment of the invention.

DESCRIPTION OF THE PREFERRD EMBODIMENT

Figure 1:
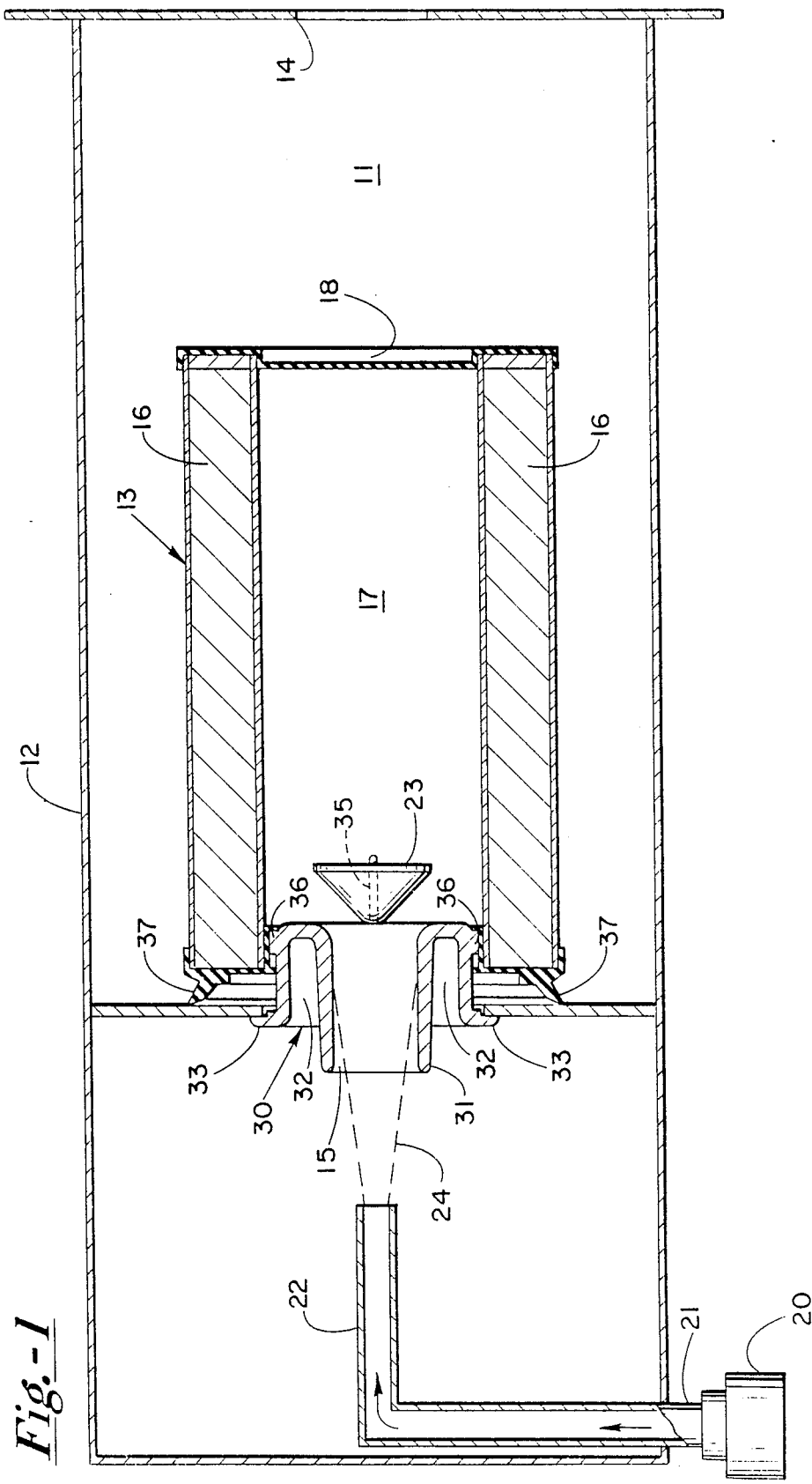

A conventional dust (or other contaminant) collector with which the instant invention is used has an air chamber 11 enclosed by a housing 12 with a cartridge-type cylindrical filter, generally designated by reference numeral 13, suitably mounted within chamber 11. Typically and conventionally, housing 12 may be mounted on the top of a bin container or vessel, not shown, which may be used in a pneumatic conveying system for storing or mixing or transporting granular material. At the bottom 14 the housing 12 has an opening to the vessel. During normal use, when the granular material is being carried pneumatically into or out of the storage vessel or when it is being pneumatically mixed in the vessel, the air used for conveying or mixing the granular material becomes laden dust or other contaminants from the granular material. This air is drawn through the opening at the bottom 14 into chamber 11 and passes through filter 13 and exits chamber 11 through a clean air opening 15 at the top of the housing 12 and then is either returned to the air supply or is exhausted to the atmosphere by means not shown. Typically and conventionally, a blower or fan, not shown, which is in air communication with the clean air opening 15, may be used to help draw the air from the vessel in the manner described. Typically, cartridge filter 13 comprises a suitable, relatively stiff, cardboard-like filter media 16 which is accordion pleated to provide maximum filtering area and surrounds a hollow air passage core 17 which is closed off at one end by an end plate or disc 18 which is sealed to the bottom edge of the filter media 16. The hollow core 17 is open at the top to communicate with the clean air opening 15. Typically and conventionally, during normal use dust-laden air passes through the filter media and the contaminants are deposited on and in the filter media so that relatively clean air enters core 17 and exits through opening 15. Some of the particles which are filtered out may fall back into the vessel through the opening in bottom 14 while most of the dust particles adhere to the filter media. After a period of time the filter media can become clogged so that it loses its efficiency or become completely blocked so that little or no air can pass through. To offset this and to clean off or dislodge the particles of contaminants, a stream of clean air is injected momentarily in the reverse direction into chamber 11 through the clean air opening 15 into core 17 and toward the filter media 16 to drive off the contaminants which may have adhered to the filter media. The reverse cleaning air is a relatively short-duration high pressure stream of air that is injected into the filter core at a momentary elevated pressure within the core so that air flows in the reverse direction through filter media 16 to dislodge the contaminants which had stuck to the filter media. Experience has shown that if this stream of high pressure air directly strikes the end plate 18 it puts a strain on the seal between the end plate 18 and the bottom edge of the filter media 16 and may eventually rupture or at least partially break the seal so that in normal use some of the contaminated air will not be filtered. Also, it has been found that if the high psessure air stream directly strikes the filter media, it may tend to tear or otherwise rupture the media itself and in that fashion also reduce or destory the effectiveness of the filter.

The pressurized cleaning air stream 24 comes from a suitable pressurized air source 20 and is carried by a conduit 21 and exits through a tubular or cylindrical nozzle 22 which has its opening facing clean air opening 15 and is coaxially aligned therewith. Located below clean air opening 15 in core 17 is a deflector or diffuser 23 preferably in the shape of a cone with the apex of the cone at the center of clean air opening 15 and the center of the core coaxially aligned with the axis of clean air opening 15 and nozzle 22. The pressurized cleaning air stream 24 exits nozzle 22 in a column but immediately fans or broadens out as it travels toward clean air opening 15 as depicted in the drawing. Nozzle 22 and clean air opening 15 are arranged with respect to one another so that the area of air stream 24 completely fills the cross section area of clean air opening 15 at some point to eliminate the possibility of cleaning air entering core 17 and flowing back out through opening 15 while the pressurized cleaning air stream is being applied. This maintains the elevated pressure in the core area. Deflector 23 prevents any of the air within the confines of air stream 24 from directly striking end plate 18 at the bottom end of core 17. Deflector 23 is located and is of suitable dimension so that all of the air in air stream 24 is deflected when it enters core 17 so that the air stream is diffused and its velocity is reduced before it reaches the filter media 16. In this fashion the velocity of the cleaning air stream is reduced so that it cannot harmfully impact the end plate or the filter media yet, at the same time, the pressure of the cleaning air is not reduced within core 17 so that there is sufficient pressure differential to cause reverse air flow through the filter media to dislodge and carry away particles of contaminants which might be resting on or in the filter media.

A preferred form of some of the key elements for practicing the invention is provided by an adapter, generally identified by reference numeral 30 which is attached to the top of housing 12. The adapter has the shape somewhat of a large candlestick holder with a central hollow vertical cylindrical or tubular member 31 providing the throat or opening 15 for the clean air and a trough or depression 32 ringing the outside of member 31 with the top edge of the outside of the trough flared out to provide a flange 33 which rests on the top of housing 12. Flange 33 may be attached to a housing in any convenient fashion such as by welding or bolting. Tubular member 31 extends vertically partway above housing 12 and partway down into chamber 11. Conical deflector or diffuser 23 is attached in some convenient fashion, such as by a suitable arm or step 35 to the underside of trough section 32. Filter assembly 13 is removably attached to adapter 30 via a ring 36 formed on the outside of the lower end of adapter 30. A rubber seal or gasket 37 rests between the top edge of filter 13 and the underside of the top of housing 12 to seal off that area against any air flow. Gasket 37 is designed such that during normal use the pressure within chamber 11 forces the lip of gasket 37 tightly against the underside of the top of the housing 12 to securely seal against leaks. Also, the housing 12 is provided with a removable door or panel (not shown) for access into chamber 11.

Cone deflector or diffuser 23 is located so that its apex is generally at the axis of opening 15. While a cone-shaped deflector is preferred, it could take other shapes. The dimensions, shape and location of diffuser 23 are matters of choice provided certain criteria are met. The diffuser 23 must prevent the stream of cleaning air 24 from directly striking end plate 18 and from directly striking the interior surface of the filter media 16. Naturally it should not significantly impede the flow of air during normal filtering. Although diffuser 23 is designed to partially impede the flow of cleaning air stream 24 it must still allow sufficient cleaning air flow into hollow core 17 so that the cleaning air will flow through all parts of the filter media to clean it uniformly while the cleaning air is being applied.

I claim:

1. A method for cleaning a dust collector filter element which is cylindrical and has a hollow air passageway core closed at one end with an end plate and open at its other end and surrounded by filter medium, comprising the steps of:
   injecting a momentary stream of pressurized air into the open end of the filter element core; and
   diffusing the injected stream of air so that the stream of air does not impact either the filter medium or the end plate.

2. The method of cleaning as described in claim 1 further including the step of closing off the open end of the filter core with the cleaning air stream for preventing any of the cleaning air from exiting the housing through the open end while the cleaning air is being injected.

3. A dust collector, comprising:
   a housing enclosing a chamber;
   an opening in the housing for contaminated air to enter the chamber;
   a clean air opening into the housing chamber;
   a cylindrical filter element mounted in the chamber such that all air travel between said opening s passes through said filter element;
   said filter element comprising a hollow cylindrical air passageway core closed at one end with an end plated and open at its other end, said core surrounded by filter medium, said core coxial with said clean air opening with the open end of the core facing said clean air opening;
   a hollow cylindrical tubular member within said clean air opening extending part way into said core;

a soure of pressurized clean air;

nozzle means in air communication with said pressurized air source for injecting a stream of air through said tubular member into said filter core; and a cone-shaped imperforate diffuser means located within said core adjacent the open end with the apex of the core facing the clean air opening and substantially in line with the center axis of said clean air opening, said diffuser means preventing the injected air stream from inpacting the filter element end plate and filter medium.

4. The filter cleaner as in claim 3 wherein said nozzle means directs the air stream to close off the opening in said tubular member for preventing flow of said pressurized cleaning air back through said tubular member opening while the cleaning air stream is being injected.

* * * * *